(12) United States Patent
Gibbons et al.

(10) Patent No.: US 6,282,087 B1
(45) Date of Patent: *Aug. 28, 2001

(54) HARD DRIVE KEYING FEATURE

(75) Inventors: Clifford A. Gibbons, Round Rock; Timothy C. Dearborn, Austin, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,661

(22) Filed: Dec. 15, 1998

(51) Int. Cl.[7] .......................................... G06F 1/16
(52) U.S. Cl. ........................ 361/685; 361/679; 361/683; 361/684; 361/686; 361/727
(58) Field of Search .................................... 361/679, 683, 361/684, 685, 686, 727

(56) References Cited

U.S. PATENT DOCUMENTS

| | | | |
|---|---|---|---|
| 5,507,650 | 4/1996 | Larabell | 439/61 |
| 5,566,383 | 10/1996 | Gildea et al. | 361/685 |
| 5,652,695 | 7/1997 | Schmitt | 361/685 |
| 5,668,696 | 9/1997 | Schmitt | 361/685 |
| 5,682,277 | 10/1997 | Hanson | 360/97.01 |
| 6,058,016 * | 5/2000 | Anderson et al. | 361/727 |

* cited by examiner

Primary Examiner—Leo P. Picard
Assistant Examiner—Yean-Hsi Chang
(74) Attorney, Agent, or Firm—Skjerven Morrill MacPherson LLP; Stephen A. Terrile; Mary Jo Bertani

(57) ABSTRACT

An assembly including a slot in a peripheral device carrier and a tab in a housing for peripheral devices, the assembly providing a structure for retaining compatible peripheral devices in a computer system, and for preventing damage to connectors when an attempt is made to install an incompatible peripheral device. The peripheral devices include a first connector portion for electronically coupling the peripheral device to a processor in a computer system. The peripheral device is installed in the peripheral device carrier that includes a slotted side member and a front member. The slot may be located at one end of the side member, or the side member may be shortened or truncated to avoid the tab when the device carrier is inserted. The side member is attached to the front member thereby forming a portion of a frame for receiving the peripheral device. The housing includes a bay having a second connector portion and at least one opening for receiving the peripheral device carrier. The bay further includes a tab positioned to engage the slotted side member when the peripheral device carrier is inserted in the bay, thereby allowing the first connector to mate with the second connector.

26 Claims, 6 Drawing Sheets

HARD DRIVE KEYING FEATURE

BACKGROUND OF THE INVENTION

1. Field of the Invention

This invention relates to computer equipment enclosures, and more particularly to peripheral device carriers for installation into peripheral device bays.

2. Description of the Related Art

Computer systems including personal computers, workstations, servers, and embedded systems typically include a motherboard on which most of the fixed internal processing circuitry of the computer is mounted. While working memory (such as random access memory or RAM) may be mounted on the motherboard, permanent memory devices typically are not. Many computer systems are designed to have multiple peripheral devices, including memory devices, included in the system. A typical personal computer system includes a processor with associated memory, control logic, and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives and/or digital video/versatile disk (DVD) drives. Additionally, computer systems often have the capability to interface with external enclosures that include additional peripheral devices. One or more data busses are coupled to connectors that mate with connectors on the peripheral devices to enable electrical communication between the peripheral devices and the rest of the computer system.

Several computer systems are often connected to a central network server including one or more mass storage devices. Multiple disk drives can be configured to cooperate advantageously using technology generally known as redundant array of inexpensive disks (RAID). RAID systems are particularly useful in the network servers because they provide data redundancy, such that if a single disk drive fails, the data stored thereon can be reconstructed from the data stored on the remaining disks. In the most sophisticated network servers and RAID systems, a failed disk drive can be replaced and the data thereon restored by software without interrupting the server's operation. In so-called "hot plugging," the failed disk drive is removed and a new one installed in its place without cutting off the power to the drive or server, and without rebooting the server. Similarly, if storage space becomes limited, disk drives can be added or upgraded without interrupting system operation. A disk drive with this capability is often referred to as "hot-pluggable."

One of the problems with the use of removable disk drives arises when a user attempts to install a carrier including a hard drive or other peripheral device in a slot wherein the internal connector in a peripheral device bay is not compatible with the connector on the peripheral device. If the peripheral device connector does not mate properly with the internal connectors in the bay, the user may jam the carrier more forcefully in the bay, which could result in damage to the connector assemblies or to the device carrier. It is therefore desirable to provide carrier and bay structures that will prevent a user from damaging a peripheral device and/or connectors in the bay when attempting to install a device having an incompatible connector.

Another problem arises when a user attempts to utilize a peripheral device carrier that is not designed for the particular bay. Often, the device carriers are sized to fit snugly within a bay to support the device when it is installed. This maintains the integrity of the connection between the peripheral device and the computer system data bus so that data communication is not interrupted, thus leading to a more reliable computer system. Further, if the device carrier is not the correct size or type, strain may be placed on the connectors, leading to damaged connections and loss of system reliability.

SUMMARY OF THE INVENTION

The present invention solves the shortcomings and deficiencies of the prior art by providing a peripheral device carrier and a corresponding bay structure that permits compatible devices to be installed while preventing installation of incompatible devices. In one embodiment, the present invention is designed for use in a computer system including a processor and memory coupled to the processor. Peripheral devices may be added to the computer system, wherein the peripheral devices include a first connector portion for electronically coupling the peripheral device to the processor. The peripheral device is installed in a peripheral device carrier that includes a slotted side member and a front member. The slot may be located at one end of the side member, or the side member may be shortened or truncated to avoid the tab when the device carrier is inserted. The side member is attached to the front member thereby forming a portion of a fine for receiving the peripheral device. A housing includes a bay having a second connector portion and at least one opening for receiving the peripheral device carrier. The bay further includes a tab positioned to engage the slotted side member when the peripheral device carrier is inserted in the bay, thereby allowing the first connector to mate with the second connector.

In one embodiment, the computer system is constructed of substantially rigid material and the tab is formed integrally with the housing.

In another embodiment, the tab comprises a portion of substantially rigid material attached to the housing.

In another embodiment, the front member of the device carrier includes a handle and the device carrier further includes a second side member attached to the front member to form a substantially U-shaped frame.

The housing may also include one or more guide members for guiding the peripheral device carrier as it is inserted in the inner portion of the housing. In this embodiment, the tab is located intermediate the guide members.

The present invention advantageously provides an assembly for retaining compatible peripheral devices in a computer system, and for preventing damage to connectors when an attempt is made to install an incompatible peripheral device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
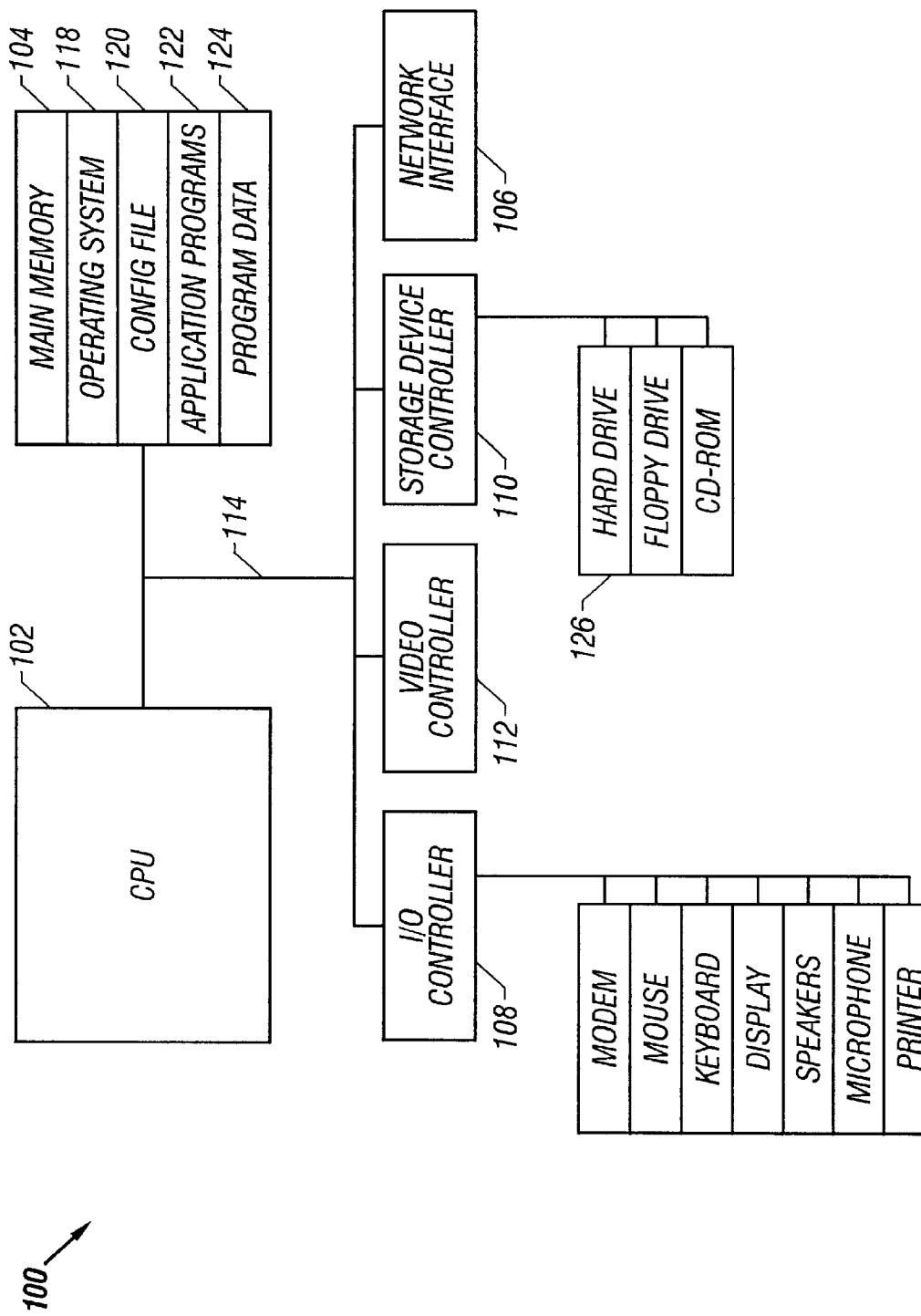
FIG. 1 is a block diagram of a computer system.

Referring to FIG. 1, components in computer system 100 includes a central processing unit (CPU) 102, main memory 104, network interface 106 and various special purpose controllers including one or more input/output (I/0) device controllers 108, storage device controllers 110, and video controller 112. System bus 114, representing one or more data busses that may be included in computer system 100, connects the components for electronic communication between them as required. I/O device controllers 108 are coupled as known to respective peripheral devices such as audio speakers, a microphone, a mouse, a keyboard, and a printer to allow a user to input data and receive information from computer system 100. Storage device controllers 110 may control the operation of different types of peripheral data storage devices such as hard disk drives, floppy disk drives, and compact disc drives. Computer system 100 may be a network server or one of many computer systems connected to a network server through network interface 106. Those skilled in the art will appreciate that this system encompasses all types of computer systems: personal computers, network servers, midrange computers, mainframes, etc.

CPU 102 can be constructed from one or more microprocessors and/or integrated circuits that are mounted on a motherboard (not shown). CPU 102 executes program instructions stored in main memory 104. Main memory 104 stores programs and data that the CPU 102 may access. When computer system 100 starts up, CPU 102 initially executes program instructions in operating system 118. Operating system 118 is a program that manages the resources of the computer system 100, such as the CPU 102, main memory 104, storage device controllers 110, network interface 106, and system bus 114. The operating system 118 reads one or more configuration files 120 to determine the hardware and software resources connected to the computer system 100. Main memory 104 includes operating system 118, the configuration file 120, one or more application programs 122, and program data 124. Operating system 118 is also capable of detecting when a hot-pluggable peripheral device is connected to computer system 100 and to control operation of system components, such as a specific I/O device controller 108 or storage device controller 110 for operating with such hot-pluggable peripheral devices.

When computer system 100 is used as a network server, storage device controllers 110 allow one or more computer systems 100 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. One suitable type of DASD is hard disk drive 126 that reads data from and writes data to a hard disk. The information from the DASD can be in many forms including application programs and program data. Data retrieved through storage device controllers 110 is usually placed in main memory 104 where CPU 102 can process it.

While main memory 104 and hard disk drive 126 are typically separate storage devices, computer system 100 may use known virtual addressing mechanisms that allow the programs of computer system 100 to behave as if they only have access to a large, single storage entity, instead of access to multiple, smaller storage entities. Therefore, while certain elements are shown to reside in main memory 104, those skilled in the art will recognize that these are not necessarily all completely contained in main memory 104 at the same time. It should be noted that the term "memory" refers to the entire virtual memory of computer system 100.

Figure 2:
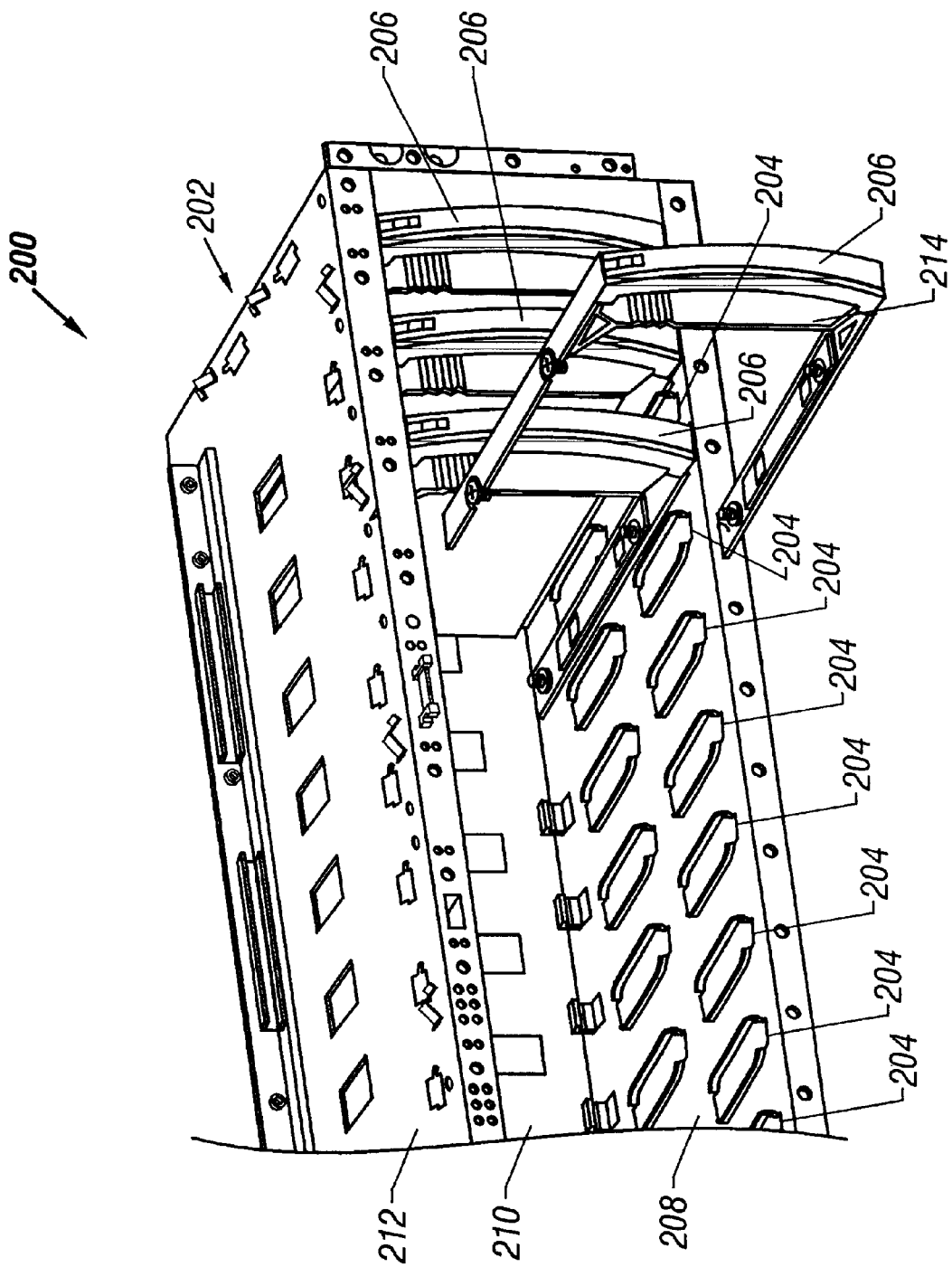
FIG. 2 is a perspective view illustrating an exemplary peripheral device carrier and a hard drive chassis with a plurality of peripheral device bays, some of which include a device carrier inserted therein.

Referring now to FIG. 2, hard drive chassis assembly 200 includes housing 202 and a plurality of bays 204, that are easily accessible by the user through the open side of housing 202. For convenient insertion and extraction of peripheral devices in bays 204, peripheral device carriers 206 are used. A peripheral device mounts on carrier 206 and carrier 206 slides into a bay 204 in housing 202. FIG. 2 shows a plurality of device carriers 206 installed in housing 202.

Peripheral devices typically include a connector to enable communication with a respective controller such as I/O controller 108 and storage device controller 110. Various types of connectors are known in the art and such connectors usually include a first portion that plugs into a second portion to form a connection between the peripheral device and computer system 100. Different connectors have different physical sizes and mating mechanisms, and an attempt to plug incompatible portions may result in damage to the connector portions. For example, some connectors include one or more rows of small, easily bent pins in the first portion that mate with corresponding sockets in the second portion. Other connectors have one or more rows of plates instead of pins that are not compatible with pin and socket type connectors.

Problems are compounded with the availability of different types of device carriers 206 that are utilized for different peripheral devices. The device carriers 206 are usually designed to support a peripheral device in housing 202 to alleviate strain on the connector (not shown). An occasion may arise when a user attempts to insert a device carrier in housing 202 that is too large or too small for the bay 204. The present invention provides an assembly that helps prevent incompatible peripheral device carriers 206 from being inserted in housing 202.

Figure 3:
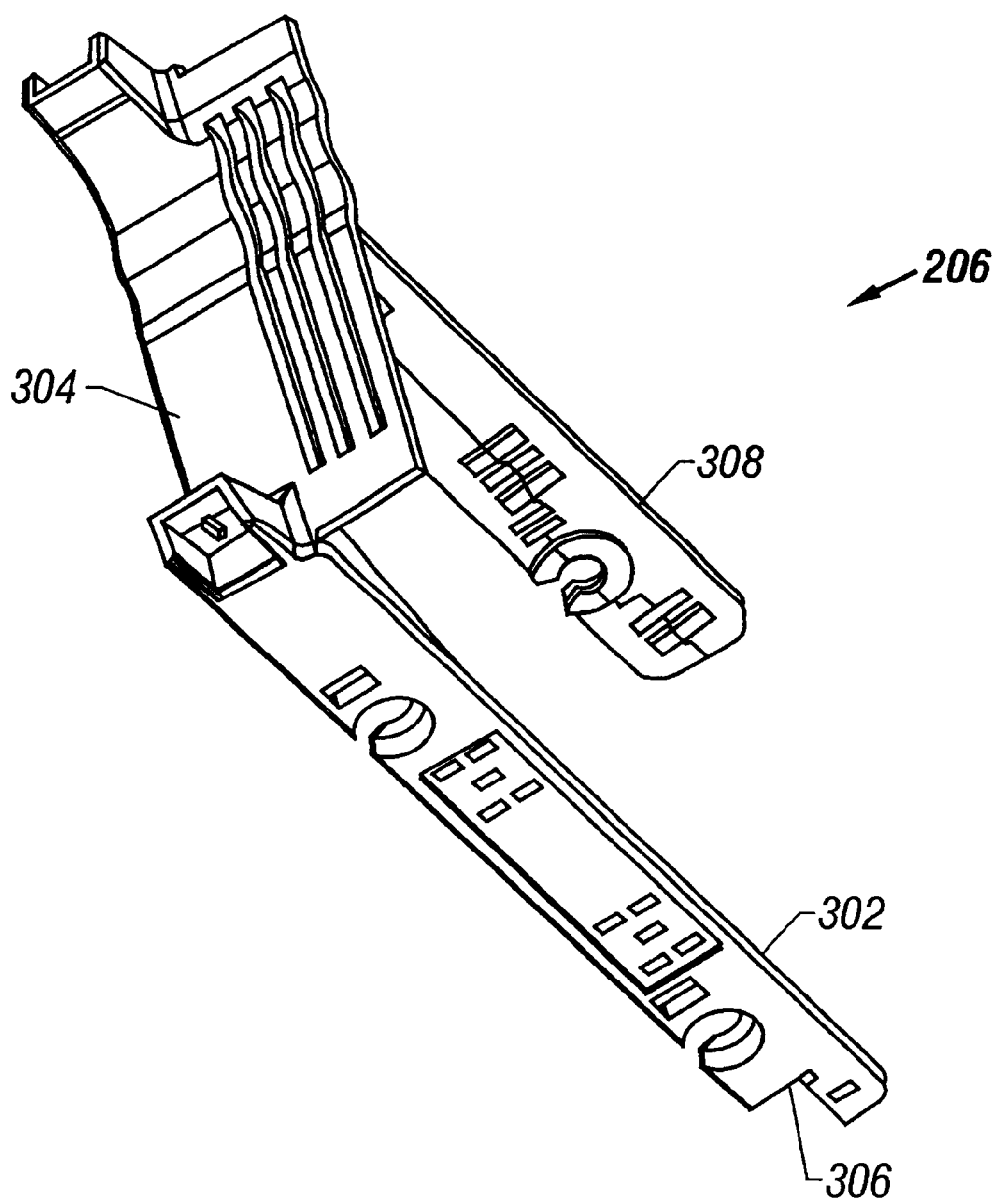
FIG. 3 is a perspective view of an exemplary tab constructed in accordance with the present invention.

In one embodiment of the present invention as shown in FIGS. 3, peripheral device carrier 206 includes slotted side member 302 and front member 304. Side member 302 is attached to front member 304 thereby forming a portion of a frame for receiving a peripheral device. Side member 302 may be formed integrally with front member 304. Alternatively, separate components for side member 302 and front member 304 may be attached to form device carrier 206.

Figure 4:
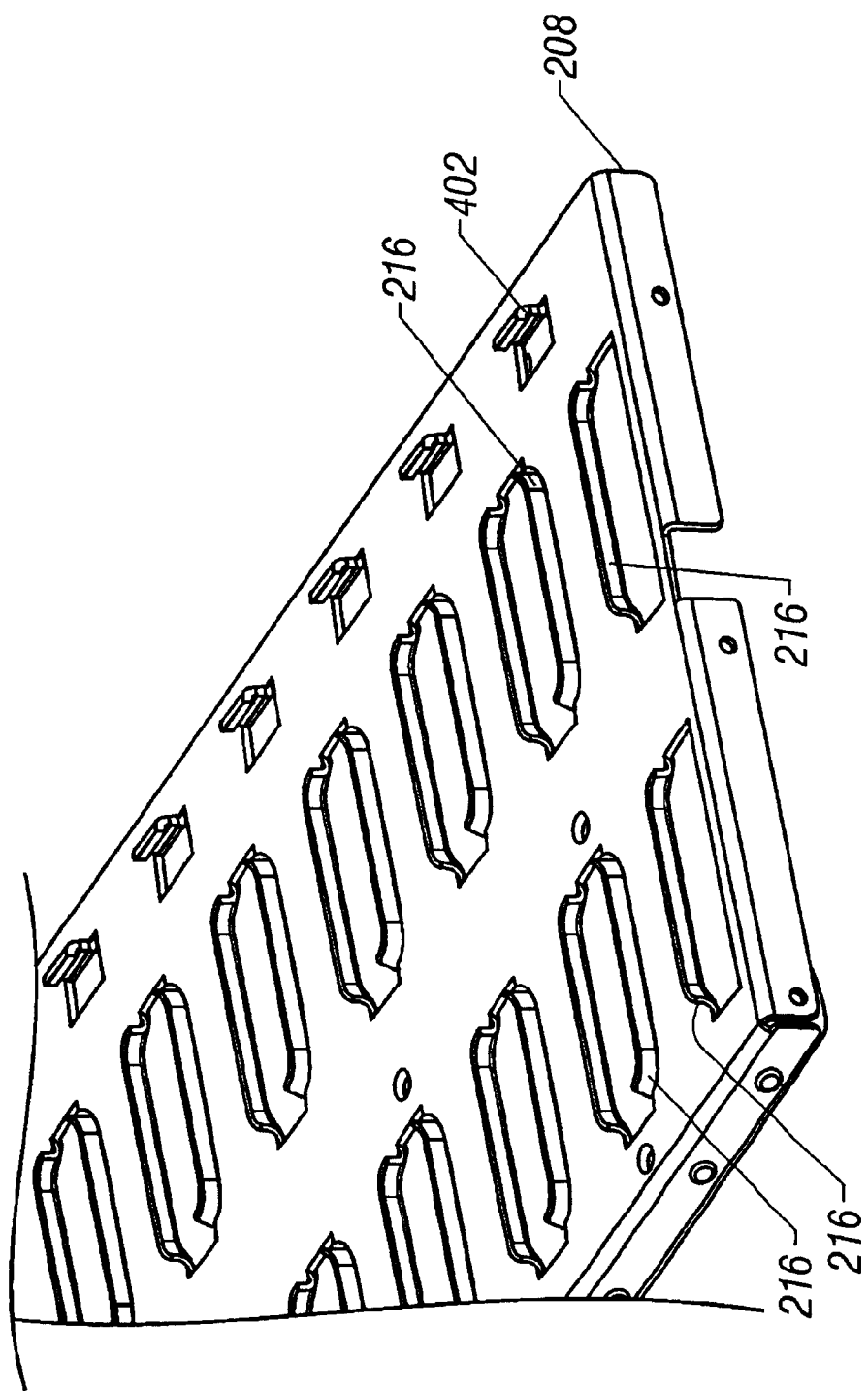
FIG. 4 is a perspective view of an exemplary device carrier constructed in accordance with the present invention.

As shown in FIG. 4, one or more of the bays 204 in housing 202 include tab 402 positioned to engage slot 306 in side member 302 when peripheral device carrier 206 is inserted in bay 204. Each bay 204 in housing 202 includes a first portion of a connector (not shown) positioned to mate with a second portion of the connector when a compatible peripheral device is installed in peripheral device carrier 206 and inserted in bay 204. Tab 402 is sized and positioned to prevent peripheral device carriers 206 that do not have compatible side members 302 from being fully inserted in bay 204. Thus, with the present invention, peripheral device carrier 206 is designed for a specific type of peripheral device. Tab 402 is positioned to allow insertion of a peripheral device carrier 206 when the peripheral device's connector portion is compatible with the connector portion in bay 204. The present invention thereby helps prevent damage to incompatible connector portions.

Figure 5:
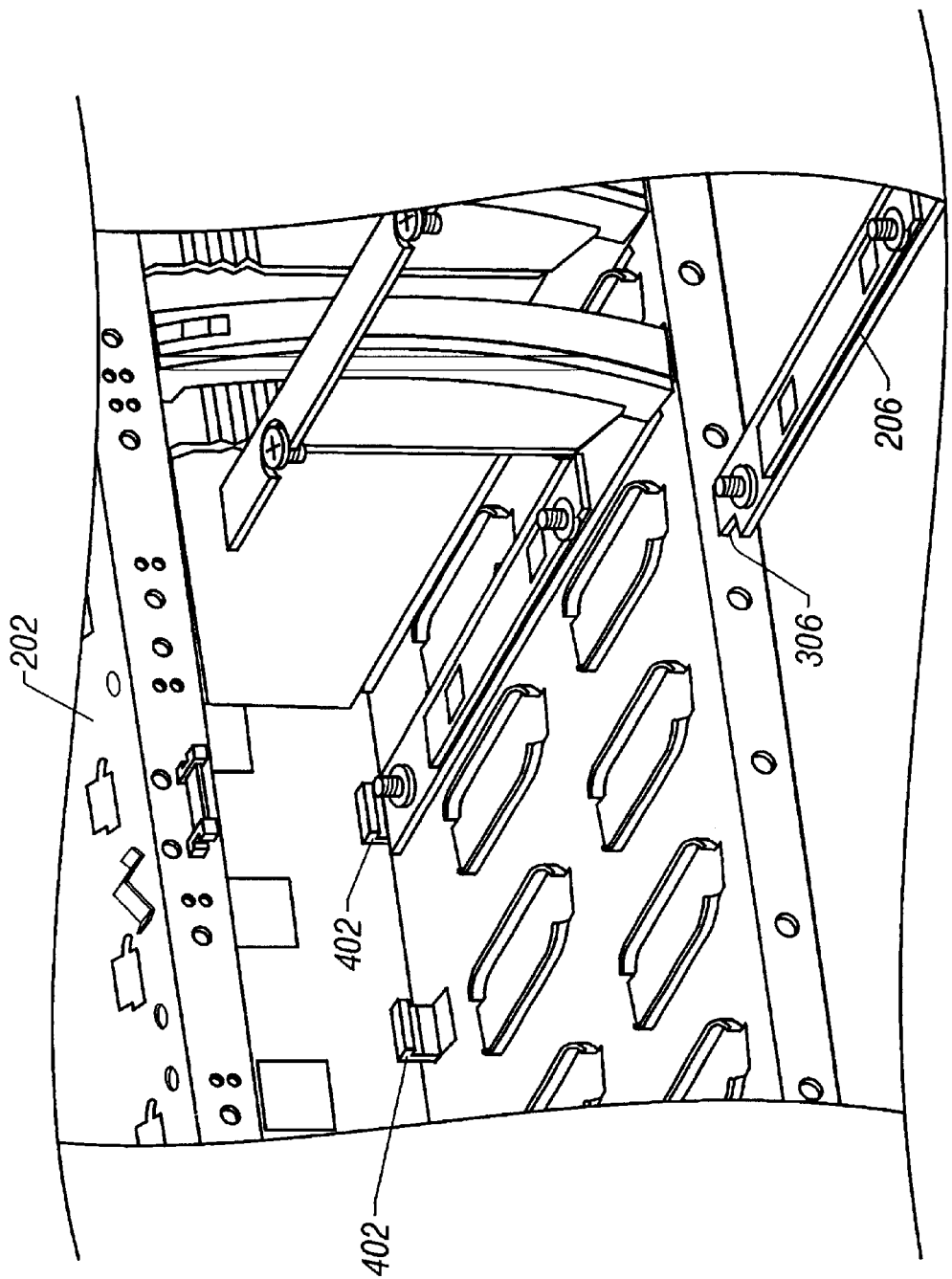
FIG. 5 is a perspective view of an exemplary device carrier installed in a housing.
Figure 6:
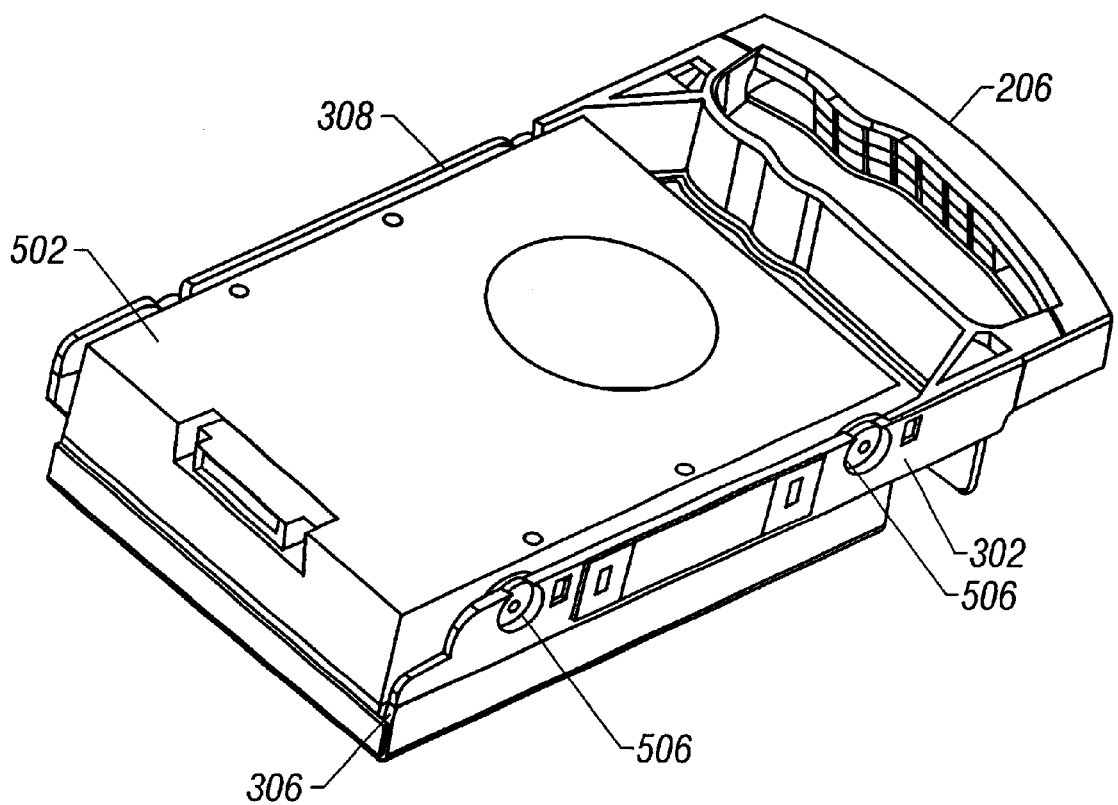
FIG. 6 is a perspective view of a device carrier with a hard drive mounted therein.

FIG. 5 shows slot 306 engaging tab 402 when peripheral device carrier 206 is installed in housing 202. FIGS. 2, 4, and 5 show tab 402 being located in the bottom wall 208 of housing 202, however tab 402 may alternatively be located in rear wall 210 or top wall 212 of housing 202. Slot 306 in side member 302 is correspondingly positioned to engage tab 402 as peripheral device carrier 206 is inserted in bay 204.

Tab 402 may be formed integrally with housing 202 as shown in FIG. 4 when housing 202 is constructed of substantially rigid material. Tab 402 is formed by bending a cutout portion of housing 202 at an angle to bottom wall 208. Alternatively, tab 402 may be a portion of substantially rigid material attached at an appropriate location to housing 202.

FIGS. 2, 3, 4, and 5 show an example of slot 306 located at one end of side member 302. The present invention may also be embodied in alternative configurations, however. For example, tab 402 may be oriented at various horizontal and vertical angles with respect to slot 306. Slot 306 may be any shape required to accommodate tab 402. Further, peripheral device carrier 206 includes a handle 214 in front member 304 and a second side member 308 attached at one end to front member 304, thereby forming a substantially U-shaped frame for receiving and retaining a peripheral device. In an alternative embodiment, the length of first side member 302 may be truncated compared to the length of the second side member, so that first side member 302 does not encounter tab 402 when peripheral device carrier 206 is inserted in bay 204. Note that tab 402 may be positioned on bottom wall 208, rear wall 210, and/or top wall 212. Thus either first side member 302, second side member 308, or both side members 302, 308, may be truncated to avoid the tab, thereby eliminating the need for slot 306.

FIG. 5 shows peripheral device carrier 206 with a peripheral device, namely a hard disk drive 502, installed. First and second side members 302, 308 provide support for disk drive 502 and also include notches 506 that receive studs on disk drive 502 to retain disk drive 502 in device carrier 206. As shown in FIG. 2, housing 202 includes guide members 216 for each bay 204 for guiding peripheral device carrier 206 as it is inserted in the inner portion of housing 202. Disk drive 502 includes a first connector portion 504 that mates with a second connector portion (not shown) on rear wall 210, also known as a backplane, when device carrier 206 is properly inserted in bay 204. Tab 402 is positioned intermediate guide members 216 to engage slot 306 as device carrier 206 is inserted. Advantageously, different tab 402 and slot 306 arrangements may be designed for specific peripheral device carrier 206 and bay 204 combinations. For example, one or more bays 204 in housing 202 may include a different type of connector than other bays 204. With the present invention, damage from attempting to install a device having an incompatible connector portion may be avoided as the slot 306 and tab 402 would be also be incompatible, thereby preventing the connector portions from coming in contact with one another.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A computer system comprising:
   a processor,
   a peripheral device including a first connector portion for electronically coupling the peripheral device to the processor,
   a peripheral device carrier for receiving the peripheral device;
   a housing including a bay, wherein the bay includes a second connector portion and at least one opening for receiving the peripheral device carrier; and
   a tab positioned in the housing based on the type of the first connector portion, wherein the peripheral device carrier is configured based on the type of the second connector portion so that the tab prevents at least a portion of the peripheral device carrier from being inserted when the first connector portion is not compatible with the second connector portion.

2. The computer system, as recited in claim 1, wherein at least a portion of the housing is constructed of substantially rigid material, the tab being formed integrally with the housing.

3. The computer system, as recited in claim 1, wherein the tab comprises a portion of substantially rigid material attached to the housing.

4. The computer system, as recited in claim 1, wherein the peripheral device carrier includes a slot located at one end of the side member.

5. The computer system, as recited in claim 1, wherein the peripheral device carrier includes a handle and forms a substantially U-shaped frame.

6. A computer system comprising:
   a housing including a first connector portion;
   a peripheral with a second connector portion; and
   a tab positioned in the inner portion of the housing, wherein the location of the tab is based on the type of the first connector portion and the peripheral is configured based on the type of the second connector portion so that the tab the peripheral from being fully inserted when the first connector portion is not compatible with the second connector portion on the peripheral.

7. The computer system, as recited in claim 6, wherein at least a portion of the housing is constructed of substantially rigid material, the tab being formed integrally with the housing.

8. The computer system, as recited in claim 6, wherein the tab comprises a portion of substantially rigid material attached to the housing.

9. The computer system, as recited in claim 6, wherein the front member includes a handle and further comprising a second side member attached to the front member to form a substantially U-shaped frame.

10. The computer system, as recited in claim 6, wherein the peripheral is configured to avoid the tab when the connector portions are compatible.

11. The computer system as recited in claim 6, further comprising a guide member for guiding the peripheral as it is inserted in the inner portion of the housing.

12. The computer system, as recited in claim 6, further comprising a pair of guide members in the inner portion of the housing, wherein the tab is located intermediate the guide members.

13. An assembly for retaining peripheral devices in a computer system, the assembly comprising:
   a housing including a first connector portion;
   a peripheral device carrier configured to receive a peripheral device, wherein the peripheral device includes a second connector portion, the peripheral device carrier including a front member and a first side member attached at one end to the front member, the first side member including a slot at another end opposite the front member, wherein the configuration of the slot is based on the type of the second connector portion; and a tab positioned in the housing based on the type of the first connector portion, wherein the tab engages the slot to allow the peripheral device carrier to be inserted in the housing when the first connector portion is comparable with the second connector portion, and further wherein the tab interferes with insertion of the peripheral device carrier when the first connector portion is not compatible with the second connector portion.

14. The assembly, as recited in claim 13, wherein at least a portion of the housing is constructed of substantially rigid material, the tab being formed integrally with the housing.

15. The assembly, as recited in claim 13, wherein the tab comprises a portion of substantially rigid material attached to the housing.

16. The assembly, as recited in claim 13, wherein the front member includes a handle and further comprising a second side member attached to the front member to form a substantially U-shaped frame.

17. The assembly, as recited in claim 13, further comprising a guide member for guiding the peripheral device carrier as it is inserted in the inner portion of the housing.

18. The assembly, as recited in claim 13, further comprising a guide member for retaining the peripheral device carrier when it is inserted in the inner portion of the housing.

19. The assembly, as recited in claim 13, further comprising a pair of guide members, wherein the tab is located intermediate the guide members.

20. An assembly for retaining peripheral devices in a computer system, the assembly comprising:

a housing having an opening and a first connector portion, a peripheral device carrier configured to receive a peripheral device, wherein the peripheral device includes a second connector portion, and the peripheral device carrier is configured based on the type of the second connector portion; and a tab positioned in the housing in a location based on the type of the first and second connector portions, wherein the tab prevents the peripheral device carrier from being fully inserted when the first and second connector portions are not compatible.

21. The assembly, as recited in claim 20, wherein at least a portion of the housing is constructed of substantially rigid material, the tab being formed integrally with the housing.

22. The assembly, as recited in claim 20, wherein the tab comprises a portion of substantially rigid material attached to the housing.

23. The assembly, as recited in claim 20, wherein the front member includes a handle and further comprising a second side member attached to the front member to form a substantially U-shaped frame.

24. The assembly, as recited in claim 23, wherein the length of the first side member is less than the length of the second side member.

25. The assembly, as recited in claim 20, further comprising a guide member for guiding the peripheral device carrier as it is inserted in the inner portion of the housing.

26. The assembly, as recited in claim 20, further comprising a pair of guide members, wherein the tab is located intermediate the guide members.

* * * * *